L. Hoszek,
House Ventilator,
№ 71,173. Patented Nov. 19, 1867.
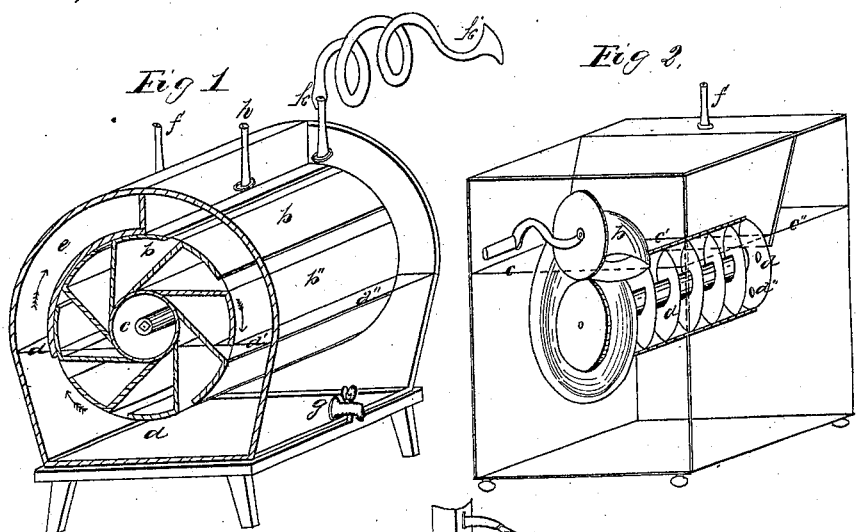
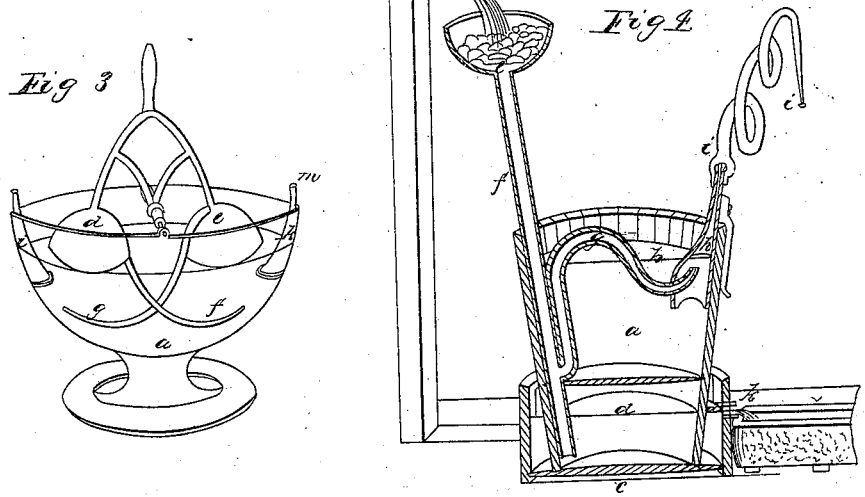
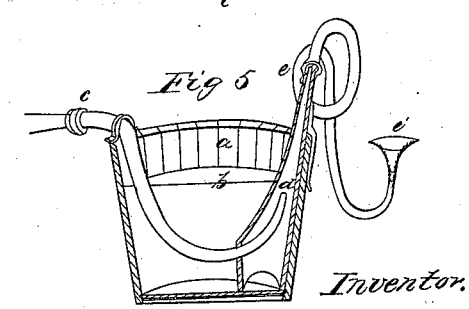
Witnesses,
Baltis DeLong
J. J. Peyton
Inventor.
Leonard Hoszek

United States Patent Office.

LEONARD HOSZEK, OF NEW YORK, N. Y.

Letters Patent No. 71,173, dated November 19, 1867.

---

VENTILATING APPARATUS.

---

*The Schedule referred to in these Letters Patent and making part of the same.*

---

TO ALL WHOM IT MAY CONCERN:

Be it known that I, LEONARD HOSZEK, of the city, county, and State of New York, have invented a new and improved Apparatus for Changing and Purifying the Atmosphere of Buildings, as well as of Modifying its Temperature, of which the following is a full, clear, and exact description, reference being had to the accompanying drawings which make part of this specification, and in which—

Figure I represents a view in perspective of one form of my improved apparatus for carrying out the objects of my invention, the casing being represented as transparent, in order to show the internal arrangement of the mechanism.

Figure II represents a similar view of another form of apparatus for attaining the same result.

Figure III represents a similar view of another modification of my invention.

Figure IV represents a sectional perspective view of another form of apparatus; and Figure V a similar view of still another modification.

It is the object of my invention to change and purify the atmosphere of buildings, and also to modify its temperature at pleasure; and to this end my invention consists in a novel apparatus for withdrawing the foul air from a room or building, which apparatus at the same time injects into the room a stream of air, to replace that previously withdrawn, the injected air being first purified, and its temperature modified by passing through a liquid containing the ingredients necessary to produce the desired result, as hereinafter described. When designed for ventilation merely, the air may be passed through water simply. To modify the temperature, the water may be warmed or cooled to the desired point. To medicate the atmosphere, vinegar, spirits of wine, solutions of chloride of lime, liquid ammonia, creosilic, phenic, or other acids and liquids may be used. Galvanic or magnetic electricity may be employed to electrify the oxygen of the injected air, and thus supply it with ozone, if necessary.

In the accompanying drawings I have illustrated several machines for carrying out the objects of my invention.

The apparatus shown in Fig. I consists of a close vessel or receptacle, $a$, in which a wheel, $b$, closed by disks at each end, revolves on a horizontal axis, $c$. The floats $b'$ $b''$ are in this instance attached to arms $b$ by one edge, so as to project at an obtuse angle to them, and in the direction in which the wheel revolves, thus forming a series of chambers, forming sectors of a circle, and open at their perimeters. The arms $b$ are arranged tangentially around a small central cylinder enclosing the axis. The vessel $a$ is filled with the liquid to be used, nearly up to the axle. A curved partition, $d$, concentric with the wheel, encloses about one-fourth of its periphery, and being connected at top with the casing by a longitudinal diaphragm or partition, forms a chamber, $e$, the lower end or mouth of which is closed by the liquid. The liquid can be drawn off by a cock, $g$. As the wheel revolves, air is drawn in through the opening $h$, which may be connected with the external air by a pipe, into the chambers of the wheel, and carried round until the floats begin to ascend on the other side, when the air escapes into the chamber $e$, and is discharged through pipe $f$, at any point desired. The air might be drawn directly from the room, and purified by passing through the liquid, or the foul air might be drawn in through a pipe, $k$, and discharged through a separate pipe leading out of doors. In this event, the vessel should be divided into two compartments by a transverse partition, or two separate wheels and vessels might be used. The red arrows indicate the direction of the movements of the machine, as well as of the currents of air. This form of apparatus is more peculiarly adapted for ships, barracks, hospitals, theatres, and other places where large quantities of pure air are required in short periods of time. The apparatus may be driven by any suitable motor.

Fig. II shows a screw, $a$, rotating on a horizontal axis, and terminating in a spiral pipe, $b$. The screw is encased in a tight cylinder, which revolves with it. As the screw revolves, the mouth of the spiral tube $b$ is alternately lifted above and depressed below the surface of the liquid. The air which enters it, when above the surface, is compressed during its descent, and escapes through openings $d$, in the end of the screw, rising up through the liquid into chamber $c$, where it escapes through pipe $f$.

Fig. III shows a form of apparatus adapted to use in parlors, bedrooms, &c. A vase, $a$, supports two cups $e$ $d$, oscillating on a horizontal axis, $c$, and moved by a handle, $h$. Pipes, $f$ $g$, lead from these cups towards the spouts $i\ k$, connected with the pipes $l\ m$. As the cups are oscillated by reciprocating the handle, their mouths are alternately raised above the level of the liquid, and plunged below it. As they rise they are filled with air, which, when they are depressed, escapes through the pipes $f\ g$, and passes up through the liquid into the spouts $i\ k$, and discharge pipes $l\ m$.

Fig. IV shows a device for operating by the pressure of a column of water in motion. A vessel, $a$, is shown as filled to the level $b$. Another vessel, $c$, is shown as filled to the level, $d$, with water. A cup, $e$, is placed on top of a pipe, $f$, leading into the vessel $c$, and open at bottom. A curved pipe, $g$, leads into vessel $a$, from pipe $f$, opening beneath the surface of the liquid into an air-chamber, $h$. In operating this device, water is poured, at intervals, into cup $e$, forcing the air in pipe $f$ through pipe $g$, and the liquid into pipe $h$, from which it is conducted to the point of discharge by a pipe, $i'$. The water escapes through a waste-way, $k$, in vessel $c$.

Fig. V shows a pipe, $c$, through which air is forced from a suitable pump, fan, or bellows, and discharged in a continuous stream under the surface of the purifying liquid in a chamber, $d$, whence the purified air escapes through a pipe, $e$. The size of the machine can of course be varied to suit the quantity of air to be discharged in a given time.

It is obvious from the foregoing description that by my apparatus the air may be purified from dust, miasma, or microscopic animalcula, and that its temperature may be increased or diminished at pleasure.

I am aware that buildings have heretofore been ventilated by currents of air, forced through water, heated or cooled, to vary the temperature of the atmosphere, and do not broadly claim such mode of operation; but having thus fully described the construction and operation of my improved apparatus, what I do claim therein as my invention, and desire to secure by Letters Patent, is—

1. The combination, with the vessel and revolving wheel, of the air-chamber and entrance and exit pipes, all these parts being constructed and arranged as shown in Fig. I, for joint operation.

2. The revolving screw, arranged and operating as shown in Fig. II, for the purpose described.

3. The combination, substantially as shown in Fig. III, of the oscillating cups and discharge pipes, for the purpose set forth.

4. The combination, substantially as shown in Fig. IV, of the pipes $f\ g$, with the vessels $a\ c$, for the purpose described.

In testimony whereof I have hereunto subscribed my name.

LEONARD HOSZEK.

Witnesses:
   N. HOMER,
   E. GOODNOUGH.